(12) United States Patent
Fink et al.

(10) Patent No.: US 11,999,469 B2
(45) Date of Patent: Jun. 4, 2024

(54) COMPOUND HELICOPTER WITH BRACED WINGS IN JOINED-WING CONFIGURATION

(71) Applicants: AIRBUS HELICOPTERS DEUTSCHLAND GMBH, Donauworth (DE); AIRBUS HELICOPTERS, Marignane (FR)

(72) Inventors: Axel Fink, Donauworth (DE); Pierre Pardoux, Aix les Milles (FR); Dominique Mailliu, Saint Chamas (FR)

(73) Assignees: AIRBUS HELICOPTERS DEUTSCHLAND GmbH, Donauworth (DE); AIRBUS HELICOPTERS, Marignane (FR)

( * ) Notice: Subject to any disclaimer, the term of this patent is extended or adjusted under 35 U.S.C. 154(b) by 34 days.

(21) Appl. No.: 17/350,609

(22) Filed: Jun. 17, 2021

(65) Prior Publication Data

US 2022/0169372 A1    Jun. 2, 2022

(30) Foreign Application Priority Data

Dec. 2, 2020  (EP) ..................................... 20400023

(51) Int. Cl.
*B64C 27/26* (2006.01)
*B64C 39/06* (2006.01)
*B64D 25/18* (2006.01)

(52) U.S. Cl.
CPC ............ *B64C 27/26* (2013.01); *B64C 39/068* (2013.01); *B64D 25/18* (2013.01)

(58) Field of Classification Search
CPC ............................... B64C 39/068; B64D 25/18
See application file for complete search history.

(56) References Cited

U.S. PATENT DOCUMENTS 2,653,778 A    9/1953  Jamieson et al.
2,940,693 A    6/1960  Steedman
(Continued)

FOREIGN PATENT DOCUMENTS

DE    3812702 A1 *  10/1989
EP    2105378 A1     9/2009
(Continued)

OTHER PUBLICATIONS

M. Denante et al: "EASA.2007.C16—Study on helicopter ditching and crashworthiness". Jul. 9, 2008(Jul. 9, 2008), XP055360113. URL:https://www.easa.europa.eu/system/files/dfu/EASAfinalreport.pdf.

(Continued)

*Primary Examiner* — Joshua J Michener
*Assistant Examiner* — Ashesh Dangol
(74) *Attorney, Agent, or Firm* — Brooks Kushman P.C.

(57) ABSTRACT

A compound helicopter with braced wings in joined-wing configuration, a fuselage that extends from a front fuselage section to a rear fuselage section, and an emergency floatation system with main floatation balloons and lateral floatation wherein balloons, the main floatation balloons comprise at least one front floatation balloon that is arranged in the front fuselage section and at least one rear floatation balloon that is arranged in the rear fuselage section, and wherein the lateral floatation balloons comprise at least one first lateral floatation balloon that is arranged close to an interconnection region of the first braced wing and at least one second lateral floatation balloon that is arranged close to an interconnection region of the second braced wing.

15 Claims, 6 Drawing Sheets

(56) References Cited

U.S. PATENT DOCUMENTS

| | | |
|---|---|---|
| 3,189,301 A | 6/1965 | Arthur |
| 3,698,666 A | 10/1972 | Monti |
| 7,309,267 B1 | 12/2007 | Henry et al. |
| 8,888,044 B2 | 11/2014 | Mailliu et al. |
| 9,315,263 B2 | 4/2016 | Cacciaguerra |
| 2009/0321554 A1 | 12/2009 | Roesch |
| 2010/0065677 A1 | 3/2010 | Ferrier |
| 2010/0230534 A1 | 9/2010 | Bravo et al. |
| 2013/0082135 A1 | 4/2013 | Moret |
| 2014/0061367 A1* | 3/2014 | Fink ................ B64C 27/26 244/6 |
| 2014/0319265 A1* | 10/2014 | Cacciaguerra ........ B64C 27/22 244/6 |
| 2018/0134398 A1* | 5/2018 | Volny ................ B64D 25/14 |
| 2018/0305040 A1* | 10/2018 | Poster ................ B64C 27/06 |
| 2018/0334257 A1* | 11/2018 | Haynes ............... B64D 25/14 |
| 2018/0346105 A1* | 12/2018 | Delorme ............. B64C 25/56 |
| 2019/0077497 A1* | 3/2019 | Uhlig ................ B64C 39/04 |

FOREIGN PATENT DOCUMENTS

| | | |
|---|---|---|
| EP | 2146896 A1 | 1/2010 |
| EP | 2262685 A1 | 12/2010 |
| EP | 2574546 A1 | 4/2013 |
| EP | 2690010 A1 | 1/2014 |
| EP | 2690011 A1 | 1/2014 |
| EP | 3141478 A1 | 3/2017 |
| EP | 3162712 B1 | 5/2017 |
| EP | 3392142 A1 | 10/2018 |
| WO | 200326959 A2 | 4/2003 |
| WO | 2008142257 A1 | 11/2008 |
| WO | 2009103987 A2 | 8/2009 |

OTHER PUBLICATIONS

European Search Report for European Application No. EP 20400023.6, Completed by the European Patent Office, Dated May 10, 2021, 9 pages.

European Patent Office, Extended European Search Report for the corresponding European Patent Application 23206166.3 dated Jan. 4, 2024.

* cited by examiner

COMPOUND HELICOPTER WITH BRACED WINGS IN JOINED-WING CONFIGURATION

CROSS-REFERENCE TO RELATED APPLICATIONS

This application claims priority to European patent application No. EP 20400023.6 filed on Dec. 2, 2020, the disclosure of which is incorporated in its entirety by reference herein.

TECHNICAL FIELD

The present disclosure relates to a compound helicopter with an emergency floatation system.

BACKGROUND

Compound helicopters are in addition to so-called convertiplanes basically the most relevant concepts aiming to overcome horizontal flight deficiencies of conventional helicopters, i.e., helicopters with a main rotor and an auxiliary tail rotor that is adapted to counter torque, by introducing attributes of fixed wing aircrafts to such conventional helicopters. Accordingly, a given compound helicopter can be designed for lift compounding, thrust compounding or a combination of both, all of which basically aim to off-load a respective main rotor from its simultaneous lifting and propulsive duties to allow for higher forward speeds of the given compound helicopter.

More specifically, lift compounding implies adding wings to a conventional helicopter, hence enabling increase of an underlying load factor of the helicopter and reaching of a higher maneuverability. This enables provision of a compound helicopter with improved efficiency at moderately high speed, but at the expense of reduced efficiencies at lower forward speeds and in hover.

Thrust compounding, in turn, implies adding essentially horizontally oriented auxiliary propulsion units to a conventional helicopter. This has been typically accomplished by means of a single propeller or a pair of propellers being driven by drive shafts powered by main turboshaft engines of a respective helicopter. The use of a pair of propulsion units has the advantage of providing a compound helicopter with improved anti-torque capabilities without the need of an additional tail rotor, hence relativizing the inherent system complexity of a thrust compound configuration.

A more extended configuration of a compound helicopter includes both the addition of wings and propulsion units. In this case, lift during cruise is simultaneously provided by a given main rotor and the wings. Higher forward speed is provided by horizontally oriented auxiliary propulsion units of the compound helicopter. The compound helicopter, thus, overcomes underlying rotor lift limits by means of the wings and underlying rotor thrust limits by means of the propulsion units. As a result, a higher load factor is obtained along with potential for higher speed. In particular, use of a pair of thrust propulsion units—opposed and both offset relative to each other and to a longitudinal axis of the compound helicopter enables for a simultaneous torque correction.

Illustrative compound helicopters with two wing-mounted propellers are described in the documents EP 2 105 378 A1, EP 2 146 896 A1, EP 2 574 546 A1, EP 2 690 010 A1, U.S. Pat. Nos. 2,653,778 A, 2,940,693 A, 3,698,666 A, 9,315,263 B2, and WO 2008/142257 A1. In all of these documents, an underlying configuration of the respective compound helicopters is based on a mono-plane wing structure with a single main wing plane.

Deviating therefrom are compound helicopters with braced wing configurations, i.e., with braced wings in box-wing or joined-wing configuration. Generally, such box-wing or joined-wing configurations are provided in the form of a bi-plane wing structure with two main wing planes. In the box-wing configuration respective braced wings comprise upper and lower wings which are joined together to form a loop-shaped closed wing without defining conventional wing tips, while in the joined-wing configuration the respective upper and lower wings are respectively joined to each other at associated wing tips.

Illustrative compound helicopters with two wing-mounted propellers and braced wings in joined-wing configuration are described in the documents EP 2 690 011 A1 and EP 3 141 478 A1. These illustrative compound helicopters are described in more detail hereinafter.

The document EP 2 690 011 A1 describes a compound helicopter having braced wings in joined-wing configuration, wherein a lower wing and an upper wing are provided on each side of the compound helicopter. Both wings are essentially straight and interconnected to each other at a wing interconnection region, and a pusher propeller is installed in the wing interconnection region behind associated trailing edges of both wings.

The document EP 3 141 478 A1 describes another compound helicopter having braced wings in joined-wing configuration. The compound helicopter has a fuselage and at least one main rotor that is at least adapted for generating lift in operation. The fuselage comprises a lower side and an upper side that is opposed to the lower side. The at least one main rotor is arranged at the upper side. At least one propeller is provided that is at least adapted for generating forward thrust in operation, the at least one propeller being mounted to a fixed wing arrangement that is laterally attached to the fuselage. The fixed wing arrangement comprises at least one braced wing with an upper wing that is connected via an upper wing root joint area to the upper side of the fuselage and at least one lower wing with an inboard section that is connected via a lower wing root joint area to the lower side of the fuselage. The upper and lower wings are at least interconnected at an associated wing interconnection region.

If such a compound helicopter, or a helicopter in general, is foreseen for overwater operations, then the helicopter must be equipped with an emergency floatation system that enables the helicopter to remain afloat after a controlled ditching on water, or water impact, in adequate attitude within specified sea conditions, such as wave height, wind condition and so on, at least the time needed for occupant evacuation. Therefore, a respective emergency floatation system is usually provided with inflatable floatation balloons which provide an adequate buoyancy volume in order to guarantee a required floatation capability of a ditched helicopter. Illustrative emergency floatation systems with landing gear mounted inflatable floatation devices resp. floatation balloons that are adapted to keep a ditched helicopter stable within certified limits are e.g., described in the documents EP 2 262 685 A1, US 2010/0230534 A1, U.S. Pat. No. 7,309,267 B1 and WO 2003/26959 A2.

In these illustrative emergency floatation systems, the floatation balloons are fitted as externally mounted packs close to the fuselage of a given helicopter, e.g., to its skid-type landing gear. Alternatively, they may e.g., be packed within internal compartments within the fuselage of the given helicopter. Inflation of the floatation balloons is usually performed by using gas stored in pressurized cylinders which are typically housed within the fuselage. The floatation balloons require dedicated attachment points on the fuselage below a respectively required position in inflated state, which are typically arranged on the lowest area of the fuselage and introduce an achievable lifting buoyancy force to the fuselage and, thus, the helicopter. Furthermore, supporting means are required for providing stabilization and counteraction of lateral and longitudinal loads to the floatation balloons in inflated state. As a result, the floatation balloons usually lean against outer hull shells of the helicopter. Moreover, in order to achieve floating stability, the floatation balloons may be arranged at a low level at both sides of the fuselage, as well as on the front and on the rear section of the helicopter, and are usually sized to maintain the helicopter in a vertical position with a slight nose-up attitude and with the waterline essentially at cabin floor level so as to allow for a safe egress in a normal helicopter upright condition.

However, these emergency floatation systems are not adapted to avoid capsizing or overturning of a ditched helicopter. Nevertheless, capsizing or overturning of helicopters after a controlled ditching on water, or water impact, have been reported to be even likely to occur immediately after ditching with deployed and inflated floatation balloons. Therefore, the ditching and water impact scenario is considered to be a crucial and particularly critical scenario for a helicopter in general that requires particular attention during development of the helicopter in order to ensure maximum occupant survival capabilities. In fact, in the ditching and water impact scenario capsizing or overturning is considered to be the most problematic and critical phenomenon that may occur.

More specifically, capsizing refers to an overturn of the helicopter with respect to its longitudinal axis, i.e., its roll axis, which may lead to a final floating upside-down attitude of the helicopter in the water. Capsizing is usually a result of a relatively high center of gravity of the helicopter and a comparatively low positioning of respective buoyancy volumes below the center of gravity at low level. A high position of the center of gravity of conventional helicopters results from large overhead masses allocated on top of the fuselage, such as the main gear box, the engines and the main rotor. Furthermore, a particular tendency to capsizing is even more aggravated by the inflated floatation balloons leaning to the fuselage, which offers moderate lever arms of the respective buoyancy volumes with respect to the roll axis and, hence, a moderate efficiency of a resulting righting moment at rising roll attitudes during capsizing.

Therefore, in view of a possible risk of capsizing, emergency floatation systems are available which entail the use of additional floatation balloons allocated within an upper region of a given helicopter. Such an emergency floatation system accepts capsizing, but ensures at least that all windows on one side of the helicopter are above the water level after capsizing, the helicopter being rolled 90° or more. Illustrative emergency floatation systems with floatation devices resp. inflatable floatation balloons mounted in upper parts of helicopters are described in the documents EP 3 162 712 B1 and U.S. Pat. No. 3,189,301.

However, in any case capsizing reduces a respective egress capability of the helicopter's occupants during immersion and inversion and increases the risk of occupants being trapped within the helicopter beneath the surface of the water such that the occupants may drown. Thus, an emergency floatation system for a helicopter should generally not only be adapted to avoid sinking, but preferably also to avoid capsizing of the helicopter.

The document EP 3 392 142 A1 describes an emergency floatation system for a helicopter that is provided for preventing capsizing, i.e., rollover after water landing. This emergency floatation system includes a deployable first and/or second boom affixed by a first end to the helicopter and capable of deployment substantially perpendicular to a longitudinal axis of the helicopter; and a first and/or second air bladder attached to a second end of the first and/or second boom, wherein the first and/or second air bladders are configured to inflate when the helicopter lands in the water, wherein deployment of the first and second boom and air bladder prevents capsizing upon water landing.

The document U.S. Pat. No. 8,888,044 B2 describes an emergency floatation system for a hybrid helicopter in mono-plane wing layout, which comprises two half-wings which are respectively provided with an associated puller propeller. The emergency floatation system is provided for keeping the hybrid helicopter afloat on water and may have inflatable elements fastened to its fuselage. Furthermore, each one of the puller propellers is provided with a fairing and an inflatable floatation balloon that is arranged in the fairing.

The document U.S. Pat. No. 9,315,263 A1 describes an emergency floatation system for a hybrid helicopter in mono-plane wing layout that is automatically triggered in an emergency case. Upon ditching of this hybrid helicopter on water and, e.g., after water detection during ditching, the emergency floatation system is automatically activated. More specifically, the hybrid helicopter comprises a fuselage and two half-wings that are respectively provided with inflatable float bags. Two main inflatable bags are arranged in the bottom portion of the fuselage and a secondary inflatable bag is arranged under each half-wing and fastened to an associated half-wing undercarriage. In particular, each secondary inflatable bag is either fastened in a hub of a wheel positioned at the end of the associated half-wing undercarriage, or to a hinged support that is connected to the associated half-wing undercarriage, or directly to an associated half-wing.

In any case, an emergency floatation system must be designed such that the floatation balloons in inflated state do not interfere or imped safe exit of a given helicopter and do not interfere with protruding structural members or equipment which could punch the floatation balloons. For simplicity and reliability, floatation balloons are frequently compartmentalized into individual cells rather than being used in form of separate balloons. The use of such multiple-cell floatation balloons attempts to minimize the effects of a severe leak or rupture in one of the multiple cells on an overall buoyancy and stability of a ditched helicopter under wave action. Nevertheless, usually four to eight floatation balloons are used, mainly depending on the size of a given helicopter.

It is furthermore common practice to use a respective helicopter subfloor volume, which is usually used as well for tank compartments, as additional buoyancy volume, which may reach up to 30% of a total required buoyancy volume. Accounting for internal fuselage volumes for buoyancy allows minimizing size and weight of required external inflatable floatation balloons, their attachments and actuation systems.

In addition to the amount of space required to house the emergency floatation system in a given helicopter, a respective overall weight of the emergency floatation system is a significant factor impacting the overall helicopter performance. Mainly depending on helicopter gross weight, the emergency floatation system reaches typical values of 1 to 4% of the gross weight. This is particularly relevant in compound helicopters with braced wings and lateral propellers, as the braced wings as such and the lateral propellers already represent a significant weight increase of the compound helicopter compared to a conventional helicopter.

SUMMARY

It is, therefore, an object of the present disclosure to provide a new compound helicopter with an emergency floatation system that exhibits improved floatation characteristics and that is adapted to provide the compound helicopter with an increased roll stability in water.

This object is solved by a compound helicopter comprising the features of claim 1. More specifically, according to the present disclosure a compound helicopter with at least one main rotor and a fuselage that extends along a longitudinal axis from a front fuselage section to a rear fuselage section comprises an emergency floatation system, and at least a first braced wing in joined-wing configuration and a second braced wing in joined-wing configuration. The first braced wing comprises a first upper wing and a first lower wing which are interconnected in a first interconnection region, and the second braced wing comprises a second upper wing and a second lower wing which are interconnected in a second interconnection region. The emergency floatation system comprises main floatation balloons and lateral floatation balloons. The main floatation balloons comprise at least one front floatation balloon that is arranged in the front fuselage section and at least one rear floatation balloon that is arranged in the rear fuselage section. The lateral floatation balloons comprise at least one first lateral floatation balloon that is arranged close to the first interconnection region and at least one second lateral floatation balloon that is arranged close to the second interconnection region.

Advantageously, the compound helicopter comprises a braced wing in joined-wing configuration on each side of the compound helicopter, with a pair of propulsion devices, i.e., lateral propellers, providing thrust, and at least one main rotor providing lift and thrust. The braced wing on each side of the compound helicopter provides additional lift during horizontal cruise flight. The lateral propellers are preferably arranged on the braced wings at the interconnection regions of respective wings, preferentially one at each side of the compound helicopter.

The lateral propellers may be driven by associated lateral gears. The associated lateral gears are preferably housed within lateral nacelles which may be arranged at outermost wing tips of the braced wings.

Each braced wing may be composed of an upper wing that is connected to an upper fuselage section, and a lower wing that is connected to a lower fuselage section. Respective wing tips of upper and lower wings of each braced wing are preferably interconnected to each other at associated wing interconnection regions.

Advantageously, the emergency floatation system is embodied to take profit of the braced wings in joined-wing configuration to provide improved and efficient floatation and capsizing avoidance characteristics. This is particularly relevant in high speed compound helicopters which are usually embodied with slim fuselage sections in order to reduce an occurring aerodynamic drag and to increase a respective high-speed performance. In such high-speed compound helicopters, the capsizing phenomenon is generally significantly aggravated by the slim fuselages as a result of lower lateral lever arms of associated inflatable floatation balloons arranged close to the fuselage, which are leaning to the fuselage.

Therefore, the emergency floatation system preferably not only includes a set of inflatable floatation balloons arranged close to the fuselage, but also at least one lateral floatation balloon that is positioned in inflated state within the tip region of an associated one of the braced wings, i.e., its wing interconnection region. The positioning may be ahead or behind a respective propeller disc of the lateral propeller arranged on the associated one of the braced wings, depending on whether the lateral propeller is installed behind the associated braced wing as a pusher propeller, or ahead of the associated braced wing as a puller propeller. In particular, a container unit housing the at least one lateral floatation balloon, which may be arranged ahead or behind the lateral nacelle, will not have any impact on the braced wing's primary structure and its aerodynamic drag, and simultaneously improves a respective bird impact protection of the lateral nacelle and its contents.

The at least one of the braced wings may comprise a lower wing with positive dihedral which extends starting from the fuselage of the compound helicopter upwards toward its outermost tip region, i.e., its wing interconnection region. Thus, a beneficial support to the at least one lateral floatation balloon in inflated state at higher roll attitudes of the compound helicopter within water may be provided.

The lower wing of at least one of the braced wings preferably comprises an internal volume that contributes to an overall buoyancy volume provided for floatability and roll stability of the compound helicopter in water. The internal volume of the lateral nacelles may represent as well an additional buoyancy volume, if designed accordingly. Similarly, the compound helicopter preferably comprises a tail boom having an internal volume that contributes likewise to the total buoyancy and further to a pitch stability of the compound helicopter in water.

Advantageously, the at least one lateral floatation balloon is positioned at least partially below the associated braced wing and is, in inflated state, in contact with the associated braced wing, preferably with the braced wing's lower wing, and/or an adjacent lateral nacelle. The at least one lateral floatation balloon may be housed within the associated braced wing or within a separate container unit which may be arranged in front of, or behind, the lateral nacelle, or below the associated braced wing, in particular below the braced wing's lower wing.

More specifically, the general configuration of the associated braced wing with its upper and lower wings enables use of the lower wing's internal volume close to the lateral nacelle to accommodate, i.e., internally house, the at least one lateral floatation balloon and an associated actuation system. Due to intrinsic hyperstatic characteristics of the braced wing, the structural box of its lower wing can be designed with a dedicated opening to allow deployment of the at least one lateral floatation balloon without structure-mechanical penalties. In particular, advantageously no aerodynamic penalties result from such a lateral floatation balloon storage within the lower wing's internal volume, thus, supporting an overall high-speed performance of the compound helicopter.

Preferably, the at least one lateral floatation balloon is attached at the outermost tip region of the associated braced wing close to or at the lateral nacelle. In particular, the lateral nacelle may be configured as a strong and large support for the at least one lateral floatation balloon.

Advantageously, the positioning of the at least one lateral floatation balloon at the outermost tip region enables provision of a buoyancy volume with a comparatively large lever of arm with respect to the longitudinal axis of the compound helicopter, thus, efficiently improving the roll stability and capsizing behaviour of the compound helicopter. Hence, the emergency floatation system as a whole beneficially exploits the natural winged architecture of the compound helicopter using the braced wings and, more particularly, the lower wings of the braced wings as lateral booms to hold respective lateral floatation balloons in a predetermined lateral distance spaced apart of the compound helicopter's fuselage. The predetermined lateral distance from the helicopter's longitudinal axis may e.g., be in the range of two to six times the width of the fuselage at the longitudinal position of the helicopter's centre of gravity. As the lower wings adopt the additional function of lateral booms, there is no need of non-structural additional elements, such as additional lateral booms, which would add undesired complexity and weight.

Preferentially, the at least one lateral floatation balloon is attached to the associated braced wing and/or the adjacent lateral nacelle by means of one or more straps. Furthermore, deployment of the at least one lateral floatation balloon may be controlled by means of a deployment and holding mechanism which allows e.g., the at least one lateral balloon to adopt a lowest possible position with respect to the adjacent lateral nacelle.

According to one aspect, the front fuselage section is located along the longitudinal axis ahead of the first braced wing and the second braced wing, and the rear fuselage section is located along the longitudinal axis behind the first braced wing and the second braced wing.

According to one aspect, the at least one front floatation balloon is mounted in the front fuselage section at a fuselage bottom border such that the at least one front floatation balloon extends in inflated state at least essentially away from the fuselage along a transversal axis of the fuselage.

According to one aspect, the at least one rear floatation balloon is mounted in the rear fuselage section at a fuselage bottom border such that the at least one rear floatation balloon extends in inflated state at least essentially away from the fuselage along a transversal axis of the fuselage.

According to one aspect, the emergency floatation system further comprises associated wing buoyancy volumes which are arranged inside of the first and second lower wings.

According to one aspect, the at least one first lateral floatation balloon is mounted to the first lower wing and deployed toward the first upper wing in inflated state, or mounted to the first upper wing and deployed toward the first lower wing in inflated state, and the at least one second lateral floatation balloon is mounted to the second lower wing and deployed toward the second upper wing in inflated state, or mounted to the second upper wing and deployed toward the second lower wing in inflated state.

According to one aspect, the at least one first lateral floatation balloon is mounted to the first lower wing, and the at least one second lateral floatation balloon is mounted to the second lower wing.

According to one aspect, the at least one first lateral floatation balloon is stored in uninflated state in a first jettisonable container unit that is mounted to and jettisonable from the first lower wing, and the at least one second lateral floatation balloon is stored in uninflated state in a second jettisonable container unit that is mounted to and jettisonable from the second lower wing.

According to one aspect, a first lateral nacelle is mounted to the first interconnection region, and a second lateral nacelle is mounted to the second interconnection region. A first propeller is mounted to the first lateral nacelle, and a second propeller is mounted to the second lateral nacelle.

According to one aspect, the at least one first lateral floatation balloon is mounted to the first lateral nacelle, and the at least one second lateral floatation balloon is mounted to the second lateral nacelle.

According to one aspect, the at least one first lateral floatation balloon is stored in uninflated state in a first jettisonable container unit that is mounted to, or integrated into, the first lateral nacelle, and the at least one second lateral floatation balloon is stored in uninflated state in a second jettisonable container unit that is mounted to, or integrated into, the second lateral nacelle.

According to one aspect, the first jettisonable container unit is arranged below the first lateral nacelle, and the second jettisonable container unit is arranged below the second lateral nacelle.

According to one aspect, the first and second propellers are pusher propellers, the first jettisonable container unit is arranged along the longitudinal axis ahead of the first propeller and the first lateral nacelle, and the second jettisonable container unit is arranged along the longitudinal axis ahead of the second propeller and the second lateral nacelle.

According to one aspect, the emergency floatation system further comprises holding mechanisms which are mounted to the at least one first lateral floatation balloon and the at least one second lateral floatation balloon. The holding mechanisms are adapted to hold the at least one first lateral floatation balloon and the at least one second lateral floatation balloon in inflated state in a predetermined position relative to the first braced wing and the second braced wing.

According to one aspect, the fuselage is connected to a tail boom, and the emergency floatation system further comprises an associated tail boom buoyancy volume that is arranged inside of the tail boom.

BRIEF DESCRIPTION OF THE DRAWINGS

Preferred embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
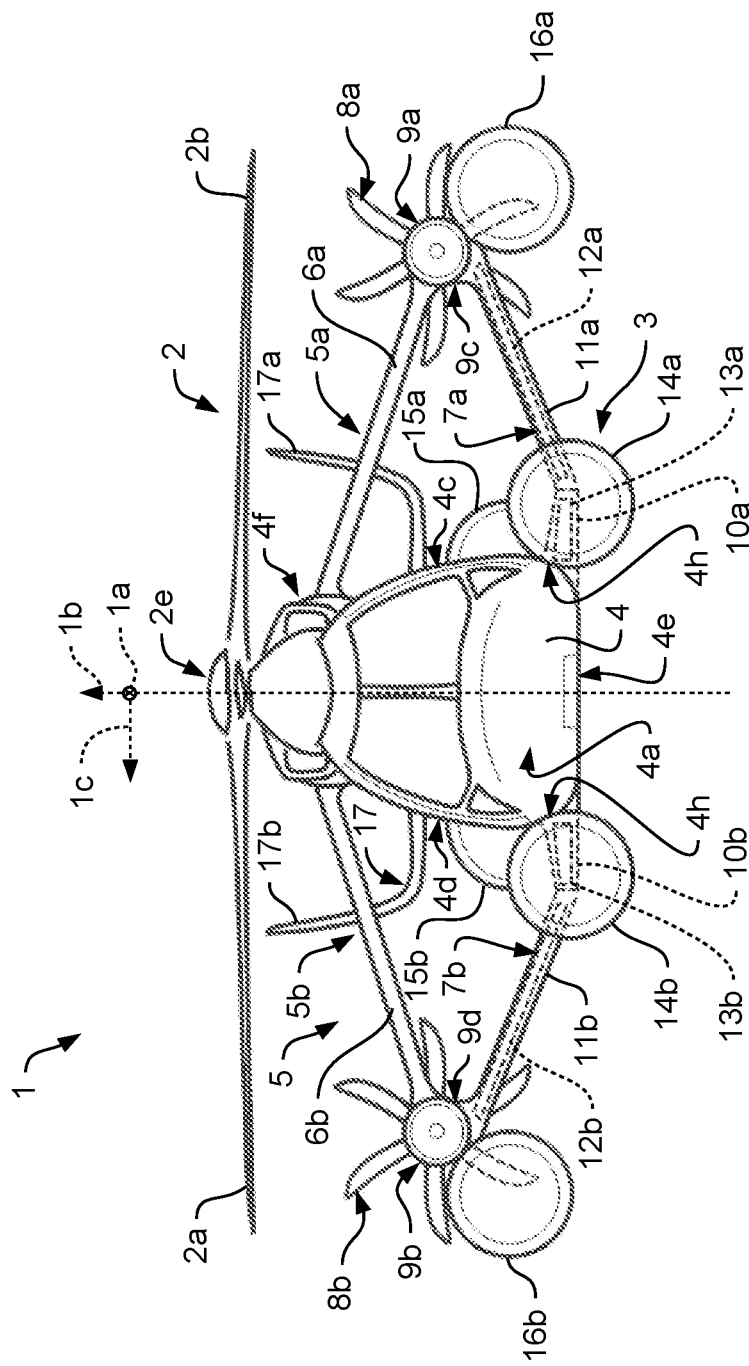
FIG. 1 is a front view of an illustrative compound helicopter with braced wings in joined-wing configuration and an emergency floatation system.

FIG. 1 shows an illustrative compound helicopter 1. The compound helicopter 1 is shown with three mutually orthogonal directions 1a, 1b and 1c. The direction 1a represents a longitudinal axis that corresponds to the roll axis inherent to the compound helicopter 1, the direction 1b represents a vertical axis that corresponds to the yaw axis inherent to the compound helicopter 1, and the direction 1c represents a transversal axis that corresponds to the pitch axis inherent to the compound helicopter 1.

Preferably, the compound helicopter 1 comprises at least one main rotor 2, an emergency floatation system 3, and a fuselage 4. The compound helicopter 1 may further comprise a landing gear, preferably a wheel-type landing gear, which may be mounted to the fuselage 4. Illustratively, the fuselage 4 has a fuselage bottom border 4h and extends along the longitudinal axis 1a from a front fuselage section 4a to a rear fuselage section (4b in FIG. 2), along the vertical axis 1b from a lower fuselage section 4e to an upper fuselage section 4f, and along the transversal axis 1c from a port side 4c of the compound helicopter 1 to a starboard side 4d of the compound helicopter 1.

The at least one main rotor 2 is at least adapted for generating lift in flight operation of the compound helicopter 1. By way of example, the at least one main rotor 2 comprises at least two rotor blades 2a, 2b, which are illustratively mounted to a rotor head 2e that is arranged above the upper fuselage section 4f of the fuselage 4.

Preferably, the compound helicopter 1 further comprises a fixed wing arrangement 5 that is laterally attached to the fuselage 4 and illustratively includes at least a first braced wing 5a in joined-wing configuration and a second braced wing 5b in joined-wing configuration. The compound helicopter 1 may further comprise a rear empennage 17 with vertical fins 17a, 17b.

By way of example, the braced wing 5a comprises an upper wing 6a and a lower wing 7a, and the braced wing 5b comprises an upper wing 6b and a lower wing 7b. Each one of the upper wings 6a, 6b preferably exhibits an anhedral angle relative to the transversal axis 1c of the compound helicopter 1. Each one of the lower wings 7a, 7b preferably exhibits at least partly a dihedral angle relative to the transversal axis 1c of the compound helicopter 1, i.e., a pronounced upward angle from the transversal axis 1c.

Illustratively, the lower wing 7a of the braced wing 5a is polyhedral and comprises an inner wing section 10a and an outer wing section 11a. The inner wing section 10a is preferably at least essentially horizontal and slightly inclined downwards with an anhedral angle relative to the transversal axis 1c of the compound helicopter 1, while the outer wing section 11a is preferably at least essentially inclined upwards with a dihedral angle relative to the transversal axis 1c of the compound helicopter 1. Similarly, the lower wing 7b of the braced wing 5b is also illustratively polyhedral and comprises an inner wing section 10b and an outer wing section 11b. The inner wing section 10b is preferably at least essentially horizontal and slightly inclined downwards with an anhedral angle relative to the transversal axis 1c of the compound helicopter 1, while the outer wing section 11b is preferably at least essentially inclined upwards with a dihedral angle relative to the transversal axis 1c of the compound helicopter 1.

The compound helicopter 1 preferably further comprises at least one propeller that is at least adapted for generating forward thrust in operation. The at least one propeller is preferentially mounted to the fixed wing arrangement 5. By way of example, the compound helicopter 1 comprises two propellers 8a, 8b, one on each side of the fuselage 4. More specifically, a first propeller 8a is illustratively mounted to the braced wing 5a and a second propeller 8b is illustratively mounted to the braced wing 5b. Preferably, the propellers 8a, 8b are pusher propellers. However, the propellers 8a, 8b may alternatively also be puller propellers.

Illustratively, the braced wing 5a with the upper wing 6a and the lower wing 7a is arranged on the port side 4c of the compound helicopter 1 and the braced wing 5b with the upper wing 6b and the lower wing 7b is arranged on the starboard side 4d of the compound helicopter 1. The upper wings 6a, 6b may be mounted to the upper fuselage section 4f of the fuselage 4 at an upper wing root joint area provided in the upper fuselage section 4f, and the lower wings 7a, 7b may be mounted to the lower fuselage section 4e of the fuselage 4 at a lower wing root joint area provided in the lower fuselage section 4e. Preferably, the upper wing 6a and the lower wing 7a of the braced wing 5a are interconnected in an interconnection region 9c, and the upper wing 6b and the lower wing 7b of the braced wing 5b are interconnected in an interconnection region 9d.

Illustratively, the pusher propellers 8a, 8b are mounted to the interconnection regions 9c, 9d. Preferably, a first lateral nacelle 9a is mounted to the interconnection region 9c and a second lateral nacelle 9b is mounted to the interconnection region 9d. The pusher propeller 8a may, thus, be mounted to the lateral nacelle 9a, and the pusher propeller 8b may be mounted to the lateral nacelle 9b, as illustrated. By way of example, the lateral nacelles 9a, 9b may be adapted to accommodate lateral gears which are driven via a main gear box of the compound helicopter 1 for driving the pusher propellers 8a, 8b. Furthermore, the lateral nacelles 9a, 9b or, more generally, the interconnection regions 9c, 9d may be used for the installation of components of the emergency floatation system 3 of the compound helicopter 1, as described in more detail hereinafter.

According to one aspect, the emergency floatation system 3 comprises a predetermined number of main floatation balloons and lateral floatation balloons. Preferably, the emergency floatation system 3 further comprises associated wing buoyancy volumes 12a, 12b, 13a, 13b which are arranged inside of the lower wings 7a, 7b of the braced wings 5a, 5b. Illustratively, the wing buoyancy volume 12a is arranged in the outer wing section 11a of the lower wing 7a, and the wing buoyancy volume 13a is arranged in its inner wing section 10a. Similarly, the wing buoyancy volume 12b is arranged in the outer wing section 11b of the lower wing 7b, and the wing buoyancy volume 13b is arranged in its inner wing section 10b.

More specifically, the emergency floatation system 3 comprises, by way of example, four main floatation balloons 14a, 14b, 15a, 15b and two lateral floatation balloons 16a, 16b, which are all illustratively shown in inflated state. However, it should be noted that at least the number of main floatation balloons may be adapted in an application-specific or design-specific manner to a particular design and configuration of a respective compound helicopter which is provided with the emergency floatation system 3, as described below at FIG. 2. Likewise, the number of lateral floatation balloons may also be adapted in an application-specific or design-specific manner to a particular design and configuration of a respective compound helicopter which is provided with the emergency floatation system 3, as described below at FIG. 4.

Figure 2:
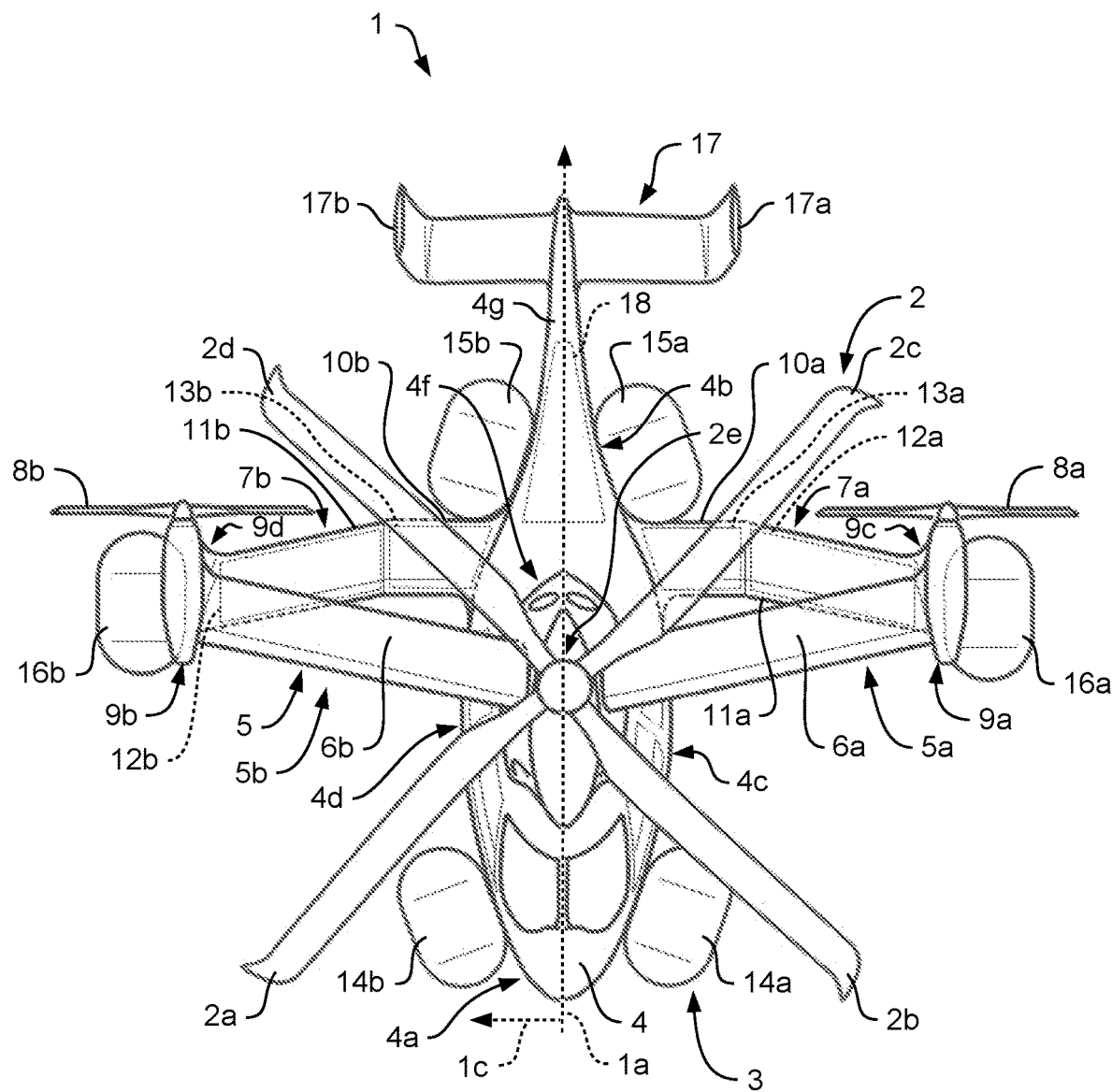
FIG. 2 is a top view of the compound helicopter of FIG. 1.

Preferably, the main floatation balloons 14a, 14b, 15a, 15b comprise at least one and, illustratively, two front floatation balloons 14a, 14b which are arranged in the front fuselage section 4a, and at least one and, illustratively, two rear floatation balloons 15a, 15b which are arranged in the rear fuselage section (4b in FIG. 2). Illustratively, the two front floatation balloons 14a, 14b are mounted in the front fuselage section 4a at the fuselage bottom border 4h such that they extend in inflated state at least essentially laterally away from the fuselage 4, in particular along the transversal axis 1c of the fuselage 4. Similarly, the two rear floatation balloons 15a, 15b are preferably mounted in the rear fuselage section (4b in FIG. 2) at the fuselage bottom border 4h such that they extend in inflated state at least essentially laterally away from the fuselage 4, in particular also along the transversal axis 1c of the fuselage 4.

The lateral floatation balloons 16a, 16b preferably comprise at least one first lateral floatation balloon 16a that is arranged close to the first interconnection region 9c, and at least one second lateral floatation balloon 16b that is arranged close to the second interconnection region 9d. Illustratively, the lateral floatation balloon 16a is mounted to the lateral nacelle 9a and the lateral floatation balloon 16b is mounted to the lateral nacelle 9b.

It should be noted that suitable mechanisms for mounting the floatation balloons 14a, 14b, 15a, 15b, 16a, 16b to the fuselage 4 and the interconnection regions 9c, 9d or the lateral nacelles 9a, 9b, as well as suitable mechanisms for deployment and inflation of the floatation balloons 14a, 14b, 15a, 15b, 16a, 16b, are well-known to the person skilled in the art. Thus, a detailed description of such mechanisms is omitted, for brevity and conciseness.

FIG. 2 shows the compound helicopter 1 of FIG. 1 with the main rotor 2, the emergency floatation system 3, the fuselage 4, the fixed wing arrangement 5, the pusher propellers 8a, 8b, and the rear empennage 17. The main rotor 2 has the rotor blades 2a, 2b and, by way of example, two further rotor blades 2c, 2d. The emergency floatation system 3 has the main floatation balloons 14a, 14b, 15a, 15b and the lateral floatation balloons 16a, 16b. The fixed-wing arrangement 5 has the braced wings 5a, 5b. The rear empennage 17 has the vertical fins 17a, 17b and is illustratively mounted to a tail boom 4g that is connected to the fuselage 4. Preferably, a tail boom buoyancy volume 18 is arranged inside of the tail boom 4g, which is associated with the emergency floatation system 3.

As described at FIG. 1, the main floatation balloons 14a, 14b, 15a, 15b of the emergency floatation system 3 comprise the two front floatation balloons 14a, 14b which are mounted in the front fuselage section 4a, and the two rear floatation balloons 15a, 15b which are mounted in a rear fuselage section 4b of the fuselage 4. Illustratively, the front fuselage section 4a is located along the longitudinal axis 1a of the fuselage 4 ahead of the braced wings 5a, 5b and the rear fuselage section 4a is located along the longitudinal axis 1a behind the braced wings 5a, 5b. More specifically, the rear fuselage section 4b forms a transition zone from the fuselage 4 to the tail boom 4g.

According to one aspect, the front floatation balloon 14a is positioned on the port side 4c of the fuselage 4 and the front floatation balloon 14b is positioned on the starboard side 4d of the fuselage 4. Similarly, the rear floatation balloon 15a is positioned on the port side 4c and the rear floatation balloon 15b is positioned on the starboard side 4d. The positioning of the front floatation balloons 14a, 14b and the rear floatation balloons 15a, 15b is preferably such that they do not inhibit egress of passengers and/or crew members out of the compound helicopter 1.

The front floatation balloons 14a, 14b and the rear floatation balloons 15a, 15b may respectively be embodied with single inflatable cells. However, they may alternatively also be embodied with two or more inflatable cells, respectively. This applies likewise to the lateral floatation balloons 16a, 16b.

Furthermore, the lateral floatation balloons 16a, 16b are preferably mounted to the interconnection regions 9c, 9d or the lateral nacelles 9a, 9b such that in inflated state they may not get in contact with the pusher propellers 8a, 8b. Illustratively, the lateral floatation balloons 16a, 16b are respectively mounted to front portions of the lateral nacelles 9a, 9b such that they are spaced apart from the pusher propellers 8a, 8b in inflated state.

Figure 3:
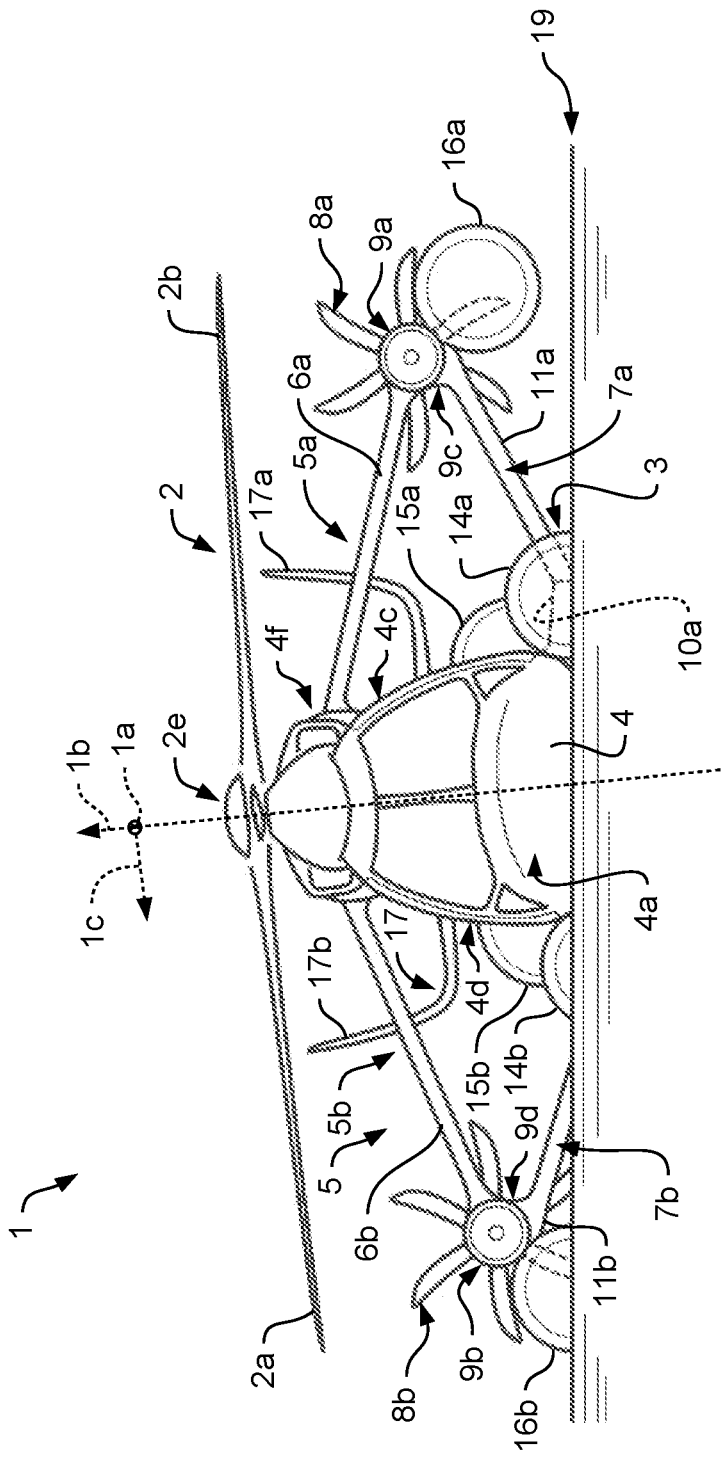
FIG. 3 is a front view of the compound helicopter of FIG. 1 after ditching into water.

FIG. 3 shows the compound helicopter 1 of FIG. 1 and FIG. 2 with the main rotor 2, the emergency floatation system 3, the fuselage 4, the fixed wing arrangement 5, the pusher propellers 8a, 8b, and the rear empennage 17. The emergency floatation system has the main floatation balloons 14a, 14b, 15a, 15b and the lateral floatation balloons 16a, 16b, all of which are shown in inflated state.

By way of example, the compound helicopter 1 is shown after ditching into water. In this case, the main floatation balloons 14a, 14b, 15a, 15b and the lateral floatation balloons 16a, 16b preferably guarantee a required floatation and capsizing avoidance capability of the compound helicopter 1, as illustrated. More specifically, the main floatation balloons 14a, 14b, 15a, 15b are preferably configured such that the fuselage 4 floats above an illustrative water line 19, while the lateral floatation balloons 16a, 16b are preferably configured to avoid capsizing of the compound helicopter 1.

Figure 4:
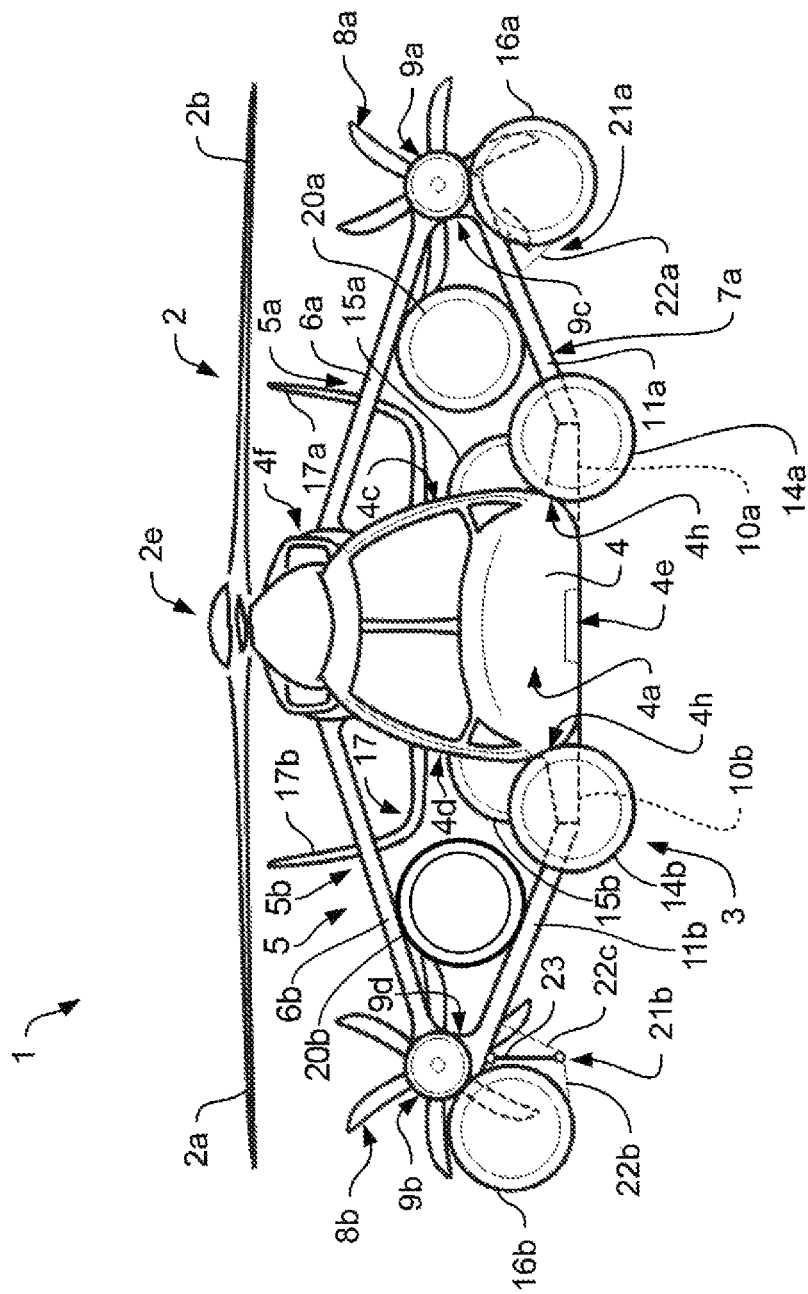
FIG. 4 is a front view of the compound helicopter of FIG. 1 with an alternative emergency floatation system.

FIG. 4 shows the compound helicopter 1 of FIG. 1 to FIG. 3 with the main rotor 2, the emergency floatation system 3, the fuselage 4, the fixed wing arrangement 5, the pusher propellers 8a, 8b, and the rear empennage 17. The fixed wing arrangement 5 has the braced wings 5a, 5b which comprise the upper wings 6a, 6b and the lower wings 7a, 7b. The emergency floatation system 3 has the main floatation balloons 14a, 14b, 15a, 15b and the lateral floatation balloons 16a, 16b, all of which are shown in inflated state.

In contrast to FIG. 1 to FIG. 3, the emergency floatation system 3 now preferably comprises in addition to the main floatation balloons 14a, 14b, 15a, 15b and the lateral floatation balloons 16a, 16b at least one additional lateral floatation balloon 20a. The at least one additional lateral floatation balloon 20a may be mounted to the lower wing 7a of the braced wing 5a and deployed in inflated state toward the upper wing 6a of the braced wing 5a. Alternatively, the at least one additional lateral floatation balloon 20a may be mounted to the upper wing 6a and deployed in inflated state toward the first lower wing 7a.

Similarly, at least one other additional lateral floatation balloon 20b may be mounted to the lower wing 7b of the braced wing 5b and deployed in inflated state toward the upper wing 6b of the braced wing 5b. Alternatively, the at least one other additional lateral floatation balloon 20b may be mounted to the upper wing 6b and deployed in inflated state toward the lower wing 7b.

It should be noted that the at least one additional lateral floatation balloon 20a and the at least one other additional lateral floatation balloon 20b are described as being provided together with the lateral floatation balloons 16a, 16b. However, in one illustrative realization they may replace the lateral floatation balloons 16a, 16b within the emergency floatation system 3.

Illustratively, the emergency floatation system 3 further comprises holding mechanisms 21a, 21b which are mounted to the lateral floatation balloon 16a, 16b. More specifically, the holding mechanisms 21a, 21b are preferably at least adapted to hold the lateral floatation balloons 16a, 16b in inflated state in a predetermined position relative to the braced wings 5a, 5b, i.e., to the lateral nacelles 9a, 9b of the braced wings 5a, 5b.

By way of example, the holding mechanism 21a merely comprises a strap 22a that attaches the lateral floatation balloon 16a to the lower wing 7a of the braced wing 5a. The strap 22a is illustratively configured to hold the lateral floatation balloon 16a in inflated state in a predetermined position relative to the lateral nacelle 9a after ditching of the compound helicopter 1 into water.

In contrast, the holding mechanism 21b preferably comprises a strap 22b that attaches the lateral floatation balloon 16b to a rod 23, which in turn is attached via a strap 22c to the lower wing 7b of the braced wing 5b. The rod 23 is preferably pivotally mounted to the lower wing 7b and may be used to support deployment of the lateral floatation balloon 16b. The straps 22b, 22c and the rod 23 are illustratively at least configured to hold the lateral floatation balloon 16b in inflated state in a predetermined position relative to the lateral nacelle 9b after ditching of the compound helicopter 1 into water and, more especially, in an outermost position, thus, maximizing a respective lever arm with respect to the compound helicopter's longitudinal axis 1a of FIG. 1 to FIG. 3.

Figure 5:
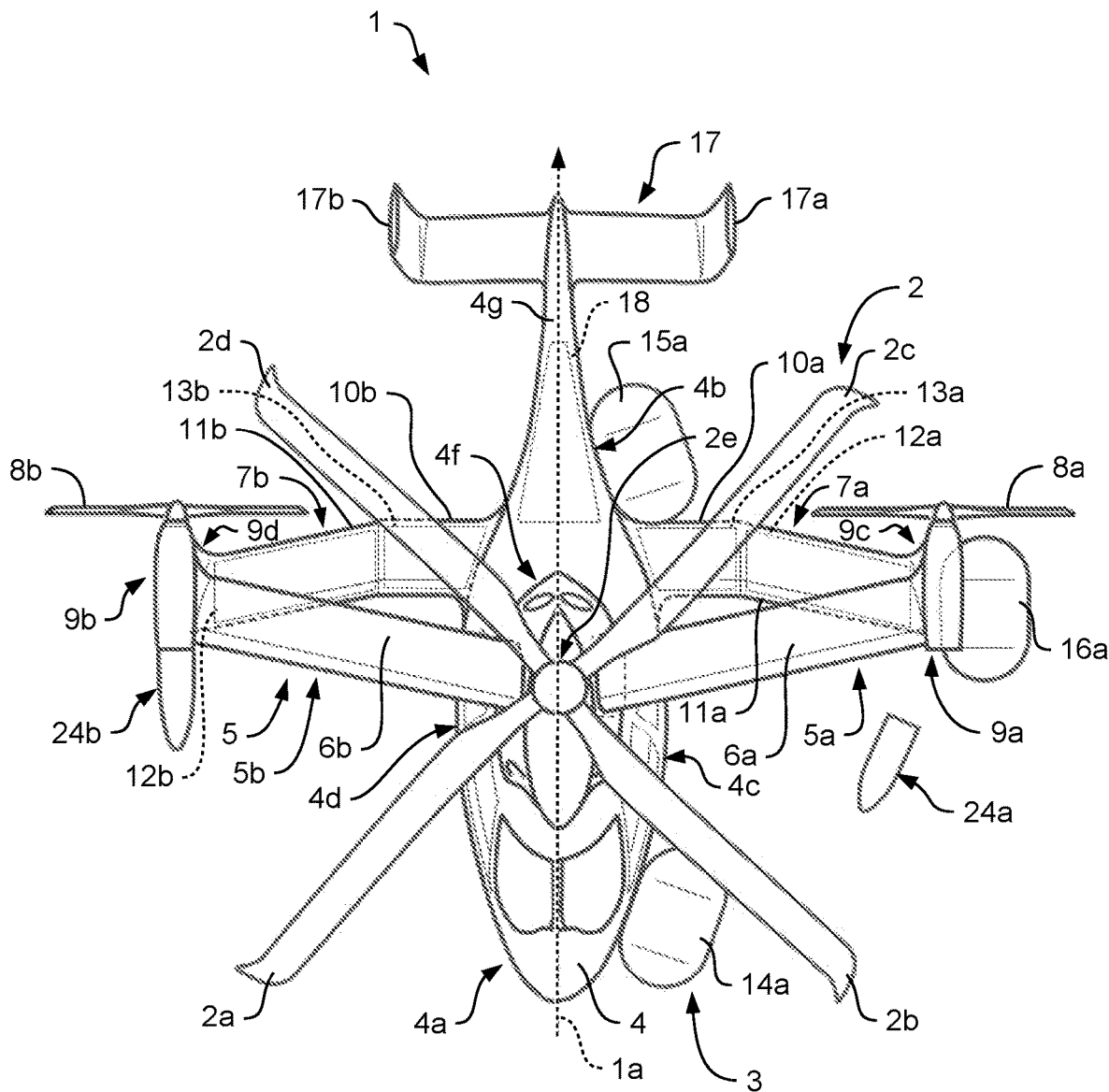
FIG. 5 is a top view of the compound helicopter of FIG. 1 with lateral nacelle-mounted floatation balloon container units.

FIG. 5 shows the compound helicopter 1 of FIG. 1 to FIG. 3 with the main rotor 2, the emergency floatation system 3, the fuselage 4, the fixed wing arrangement 5, the pusher propellers 8a, 8b, and the rear empennage 17. The emergency floatation system has the main floatation balloons 14a, 15a and the lateral floatation balloon 16a, all of which are shown in inflated state. However, the main floatation balloons 14b, 15b and the lateral floatation balloon 16b are assumed to be in uninflated state and, thus, not visible on the compound helicopter 1 viewed from above.

In contrast to FIG. 1 to FIG. 3, the emergency floatation system 3 now preferably comprises jettisonable container units 24a, 24b. These jettisonable container units 24a, 24b preferably accommodate the lateral floatation balloons 16a (and 16b of FIG. 1 to FIG. 3) in uninflated state and they are jettisoned upon deployment of the lateral floatation balloons 16a (and 16b of FIG. 1 to FIG. 3) during inflation. By way of example, the jettisonable container unit 24a is illustrated in jettisoned state, while the jettisonable container unit 24b is illustrated in mounted state.

Preferably, the jettisonable container unit 24a is mounted to, or integrated into, the lateral nacelle 9a, and the jettisonable container unit 24b is mounted to, or integrated into, the lateral nacelle 9b. Illustratively, the jettisonable container unit 24a is arranged along the longitudinal axis 1a of the fuselage ahead of the pusher propeller 8a and the lateral nacelle 9a, i.e., mounted to a front portion of the lateral nacelle 9a in the illustrated example. Similarly, the jettisonable container unit 24b is arranged along the longitudinal axis 1a ahead of the pusher propeller 8b and the lateral nacelle 9b, i.e., mounted to a front portion of the lateral nacelle 9b in the illustrated example.

It should be noted that the described arrangement is suitable if the propellers 8a, 8b are pusher propellers, as described above. If, however, puller propellers are used, then the jettisonable container units 24a, 24b are preferably arranged along the longitudinal axis 1a of the fuselage 4 behind the puller propellers and the lateral nacelles 9a, 9b.

Figure 6:
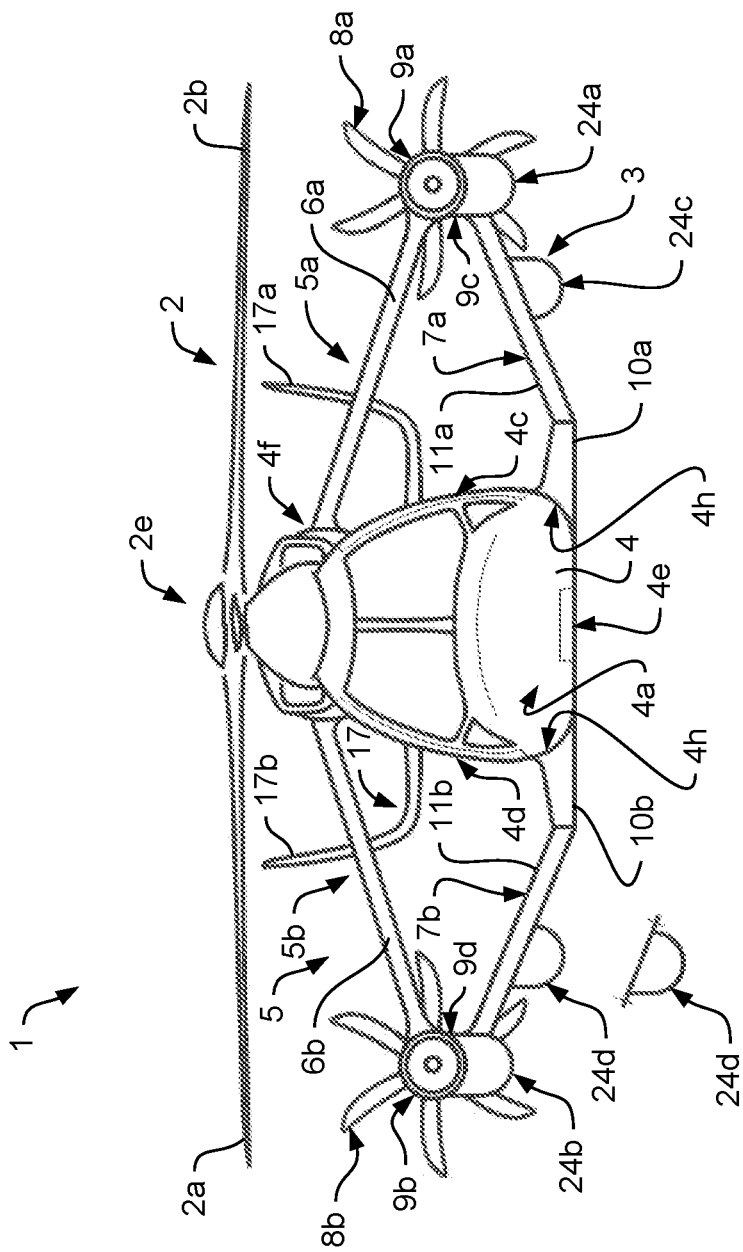
FIG. 6 is a front view of the compound helicopter of FIG. 1 with lateral nacelle-mounted and lower wing-mounted floatation balloon container units.

FIG. 6 shows the compound helicopter 1 of FIG. 5 with the main rotor 2, the emergency floatation system 3, the fuselage 4, the fixed wing arrangement 5, the pusher propellers 8a, 8b, and the rear empennage 17. The fixed wing arrangement 5 has the braced wings 5a, 5b which comprise the upper wings 6a, 6b and the lower wings 7a, 7b. The emergency floatation system 3 has the jettisonable container units 24a, 24b and further comprises the main floatation balloons 14a, 14b, 15a, 15b and the lateral floatation balloons 16a, 16b. However, the main floatation balloons 14a, 14b, 15a, 15b and the lateral floatation balloons 16a, 16b are assumed to be in uninflated state and, thus, not visible on the compound helicopter 1 viewed from the front.

In contrast to FIG. 5, the jettisonable container units 24a, 24b of the emergency floatation system 3 are now arranged below the lateral nacelles 9a, 9b. More specifically, the jettisonable container unit 24a is illustratively arranged below the lateral nacelle 9a and the jettisonable container unit 24b is arranged below the lateral nacelle 9b.

Moreover, also in contrast to FIG. 5, the emergency floatation system 3 now further comprises a first additional under-wing floatation balloon which is mounted to, and illustratively below, the lower wing 7a of the braced wing 5a, and a second additional under-wing floatation balloon which is mounted to, and illustratively below, the lower wing 7b of the braced wing 5b. Preferably, the first additional under-wing floatation balloon is stored in uninflated state in a jettisonable container unit 24c that is mounted to, and jettisonable from, the lower wing 7a, and the second additional under-wing floatation balloon is stored in uninflated state in a jettisonable container unit 24d that is mounted to, and jettisonable from, the second lower wing 7b. By way of example, the jettisonable container unit 24d is shown in mounted state as well as in jettisoned state.

It should be noted that the first and second additional under-wing floatation balloons are described as being provided together with the lateral floatation balloons 16a, 16b. However, in one illustrative realization they may also replace the lateral floatation balloons 16a, 16b within the emergency floatation system 3.

It should further be noted that modifications to the above described embodiments are within the common knowledge of the person skilled in the art and, thus, also considered as being part of the present disclosure. For instance, the main floatation balloons 14a, 14b, 15a, 15b described above may also be provided with jettisonable container units, and so on.

REFERENCE LIST

1 Compound helicopter
1a Longitudinal axis
1b Vertical axis
1c Transversal axis
2 Main Rotor
2a, 2b, 2c, 2d Rotor blades
2e Rotor head
3 Emergency floatation system
4 Fuselage
4a Front fuselage section
4b Rear fuselage section
4c Port side
4d Starboard side
4e Fuselage bottom
4f Upper fuselage area
4g Tail boom
4h Fuselage bottom border
5 Fixed wing arrangement
5a, 5b Braced wings
6a, 6b Upper wings
7a, 7b Lower wings
8a, 8b Propeller
9a, 9b Lateral nacelles 9c, 9d Interconnection regions of upper and lower wings
10a, 10b Inner lower wing sections
11a, 11b Outer lower wing sections
12a, 12b Outer lower wing buoyancy volumes
13a, 13b Inner lower wing buoyancy volumes
14a, 14b Front main floatation balloons
15a, 15b Rear main floatation balloons
16a, 16b Lateral floatation balloons
17 Rear empennage
17a, 17b Vertical fins
18 Tail boom buoyancy volume
19 Water line
20a Inter-wing floatation balloon
21a, 21b Holding mechanisms
22a, 22b, 22c Holding straps
23 Holding rod
24a, 24b, 24c, 24d Floatation balloon container units

What is claimed is:

1. A compound helicopter with at least one main rotor and a fuselage that extends along a longitudinal axis from a front fuselage section to a rear fuselage section, comprising:
at least a first braced wing in joined-wing configuration and a second braced wing in joined-wing configuration, wherein the first braced wing comprises a first upper wing having a first outermost upper wing tip and a first lower wing having a first outermost lower wing tip, the first outermost upper and lower wing tips are interconnected in a first interconnection region, and wherein the second braced wing comprises a second upper wing having a second outermost upper wing tip and a second lower wing having a second outermost lower wing tip, the second outermost upper and lower wing tips are interconnected in a second interconnection region; and
an emergency floatation system with main floatation balloons and lateral floatation balloons, wherein the main floatation balloons comprise at least one front floatation balloon that is arranged in the front fuselage section and at least one rear floatation balloon that is arranged in the rear fuselage section, and wherein the lateral floatation balloons comprise at least one first lateral floatation balloon arranged at the first interconnection region below the first lower wing and at least one second lateral floatation balloon arranged at the second interconnection region below the second lower wing; and
wherein the lateral floatation balloons further comprise at least one first additional lateral floatation balloon, the at least one first additional lateral floatation balloon is arranged midway between the fuselage and the first interconnection region and is either mounted to an upper side of the first lower wing and deployed toward in contact with a lower side of the first upper wing in inflated state or mounted to the lower side of the first upper wing and deployed toward in contact with the upper side of the first lower wing in inflated state.

2. The compound helicopter of claim 1 wherein the front fuselage section is located along the longitudinal axis ahead of the first braced wing and the second braced wing, and wherein the rear fuselage section is located along the longitudinal axis behind the first braced wing and the second braced wing.

3. The compound helicopter of claim 1 wherein the at least one front floatation balloon is mounted in the front fuselage section at a fuselage bottom border such that the at least one front floatation balloon extends in inflated state at least essentially away from the fuselage along a transversal axis of the fuselage.

4. The compound helicopter of claim 1 wherein the at least one rear floatation balloon is mounted in the rear fuselage section at a fuselage bottom border such that the at least one rear floatation balloon extends in inflated state at least essentially away from the fuselage along a transversal axis of the fuselage.

5. The compound helicopter of claim 1 wherein the emergency floatation system further comprises associated wing buoyancy volumes which are arranged inside of the first and second lower wings.

6. The compound helicopter of claim 1 wherein the lateral floatation balloons further comprise at least one second additional lateral floatation balloon, the at least one second additional lateral floatation balloon is arranged midway between the fuselage and the second interconnection region and is either mounted to an upper side of the second lower wing and deployed toward in contact with a lower side of the second upper wing in inflated state or mounted to the lower side of the second upper wing and deployed toward in contact with the upper side of the second lower wing in inflated state.

7. The compound helicopter of claim 1 wherein the at least one first lateral floatation balloon is stored in uninflated state in a first jettisonable container unit that is mounted to and jettisonable from the first outermost lower wing tip, and wherein the at least one second lateral floatation balloon is stored in uninflated state in a second jettisonable container unit that is mounted to and jettisonable from the second outermost lower wing tip.

8. The compound helicopter of claim 1 wherein a first lateral nacelle is mounted to the first interconnection region, wherein a second lateral nacelle is mounted to the second interconnection region, wherein a first propeller is mounted to the first lateral nacelle, and wherein a second propeller is mounted to the second lateral nacelle.

9. The compound helicopter of claim 1 wherein the at least one first lateral floatation balloon and the at least one second lateral floatation balloon are held in inflated state in a predetermined position relative to the first braced wing and the second braced wing.

10. The compound helicopter of claim 1 wherein the fuselage is connected to a tail boom, and wherein the emergency floatation system further comprises an associated tail boom buoyancy volume that is arranged inside of the tail boom.

11. A compound helicopter with at least one main rotor and a fuselage that extends along a longitudinal axis from a front fuselage section to a rear fuselage section, the compound helicopter comprising:
a first braced wing in joined-wing configuration and a second braced wing in joined-wing configuration, the first braced wing comprising a first upper wing and a first lower wing interconnected in a first interconnection region, and the second braced wing comprising a second upper wing and a second lower wing interconnected in a second interconnection region; and
an emergency floatation system comprising main floatation balloons and lateral floatation balloons, wherein the main floatation balloons comprise a front floatation balloon arranged in the front fuselage section and a rear floatation balloon arranged in the rear fuselage section, wherein the lateral floatation balloons comprise a first lateral floatation balloon either mounted to an upper side of the first lower wing midway between the fuselage and the first interconnection region and deployed toward in contact with a lower side of the first upper wing in inflated state or mounted to the lower side of the first upper wing midway between the fuselage and the first interconnection region and deployed toward in contact with the upper side of the first lower wing in inflated state, a second lateral floatation balloon either mounted to an upper side of the second lower wing midway between the fuselage and the second interconnection region and deployed toward in contact with a lower side of the second upper wing in inflated state or mounted to the lower side of the second upper wing midway between the fuselage and the second interconnection region and deployed toward in contact with the upper side of the second lower wing in inflated state, and a third lateral floatation balloon arranged at the first interconnection region below the first lower wing.

12. The compound helicopter of claim 11 wherein the front fuselage section is located along the longitudinal axis ahead of the first braced wing and the second braced wing, and wherein the rear fuselage section is located along the longitudinal axis behind the first braced wing and the second braced wing.

13. The compound helicopter of claim 12 wherein the front floatation balloon is mounted in the front fuselage section at a fuselage bottom border such that the front floatation balloon extends in inflated state at least essentially away from the fuselage along a transversal axis of the fuselage.

14. The compound helicopter of claim 13 wherein the rear floatation balloon is mounted in the rear fuselage section at the fuselage bottom border such that the rear floatation balloon extends in inflated state at least essentially away from the fuselage along the transversal axis of the fuselage.

15. The compound helicopter of claim 14 wherein the emergency floatation system further comprises associated wing buoyancy volumes which are arranged inside of the first and second lower wings.

* * * * *